United States Patent
Reader

[11] 3,917,936
[45] Nov. 4, 1975

[54] METHOD AND APPARATUS FOR MEASURING THE CROSS-CORRELATION OF TWO DYNAMIC MECHANICAL QUANTITIES

[76] Inventor: Wayne T. Reader, P.O. Box 237, Monrovia, Md. 21770

[22] Filed: Feb. 20, 1974

[21] Appl. No.: 444,222

[52] U.S. Cl. .................. 235/181; 73/71.4; 235/193
[51] Int. Cl.² ........................................... G06G 7/19
[58] Field of Search........... 235/181, 194; 73/194 R, 73/194 E, 194 C, 71.2, 71.4

[56] References Cited
UNITED STATES PATENTS

| | | | |
|---|---|---|---|
| 2,989,726 | 6/1961 | Crawford et al. | 235/181 |
| 3,300,630 | 1/1967 | Hartenstein | 235/194 |
| 3,358,231 | 12/1967 | Baganoff | 235/181 |
| 3,406,332 | 10/1968 | Hieronymus | 235/194 |
| 3,439,270 | 4/1969 | Rehm | 235/194 |
| 3,471,688 | 10/1969 | Goebel | 235/194 |
| 3,591,788 | 7/1971 | Brodin | 235/181 |
| 3,789,663 | 2/1974 | Gold | 73/194 |

*Primary Examiner*—Felix D. Gruber
*Attorney, Agent, or Firm*—R. S. Sciascia; O. E. Hodges

[57] ABSTRACT

A method and apparatus for measurement of the cross-correlation function between two dynamic mechanical quantities. The voltage generated by a transducer at a first location is delayed and then serves as the energizing voltage of a passive electro mechanical transducer at a second location. The transducer at the second location measures the mechanical excitation at that location and also performs the multiplication of this generated signal with the signal originating at the first location. The product signal is averaged to produce a voltage proportional to the cross-correlation between the measured mechanical quantities.

10 Claims, 3 Drawing Figures

METHOD AND APPARATUS FOR MEASURING THE CROSS-CORRELATION OF TWO DYNAMIC MECHANICAL QUANTITIES

The invention described herein may be manufactured and used by or for the Government of the United States of America for governmental purposes without the payment of any royalties thereon or therefor.

BACKGROUND OF THE INVENTION

The cross-correlation function $\phi(\tau)$ of two functions, $f_1(t)$ and $f_2(t)$, both depending upon the same independent variable, $t$, is defined by the equation $$(1) \quad \phi(\tau) = \lim_{T \to \infty} \int_{-T}^{T} \frac{1}{2T} f_1(t) f_2(t+\tau) dt = \overline{f_1(t) f_2(t+\tau)}$$

In general, the variable $t$ may represent either a spacial or temporal variable, and $\tau$ is some shift in value of the variable $t$. The cross-correlation function as given in equation (1) may be recognized as the average of the product of the functions $f_1(t)$ and $f_2(t+\tau)$, the average being taken over the interval $-T \leq t \leq T$ as the interval bounds become infinitely large.

Commercial apparatus is available to obtain the correlation function but is expensive, bulky, and consists of complicated circuitry which increases the probability of errors because of the inherent difficulty in determining whether it is operating properly.

SUMMARY OF THE INVENTION

The method and apparatus presented in this invention for determining the cross-correlation function uses a simple technique, is inexpensive and uses unsophisticated equipment available in most research laboratories. Generally, the invention comprises a transducer at a first location for measuring the mechanical excitation at that location, a transducer at a second location for measuring the mechanical excitation at the second location, and a delay means for delaying the electrical signal from the transducer at the second location. The output of the first transducer is a signal which is proportional to the product of the signals representing the first and second mechanical quantities at the first and second locations. The product signal is then averaged to obtain a signal representative of the cross-correlation function between the two mechanical quantities. The invention may be used, for example, to obtain the cross-correlation between the acceleration at one location and the dynamic strain at a second location on a vibrating mechanical structure, or it may be used to obtain the correlation between the velocity at a location on a vibrating structure and the sound pressure radiated by the structure to a location in the surrounding fluid media. Similarly, the invention may be used to determine if an excitation occurs from a single source or from multiple sources.

OBJECTS OF THE INVENTION

Accordingly, it is among the objects of the present invention to provide a means for measuring the cross-correlation between two mechanical quantities with a simple technique using inexpensive, unsophisticated equipment available in most research laboratories.

Another object of the present invention is to eliminate the need of a separate multiplication unit.

Yet another object of this invention is the provision of a novel transducer arrangement wherein the transducer itself acts as a multiplication unit.

Other objects, advantages and novel features of the invention will become apparent from the following detailed description of the invention when considered in conjunction with the accompanying drawings wherein.

DESCRIPTION OF THE PREFERRED EMBODIMENT:

In the succeeding description of this invention, the transducer will be referred to as one of two types; (1) an active electro mechanical transducer or (2) a passive electro mechanical transducer. An active electro mechanical transducer is one which is self generating, i.e., it produces an electrical signal proportional to a mechanical quantity acting upon it in a prescribed manner and generates this signal without the necessity of an external electrical power source. A passive electro mechanical transducer is one which requires the use of an external power source to produce an electrical signal proportional to the mechanical quantity exciting it. As examples, a piezo electric accelerometer is of the active type and a strain gauge is of the passive type.

Figure 1:
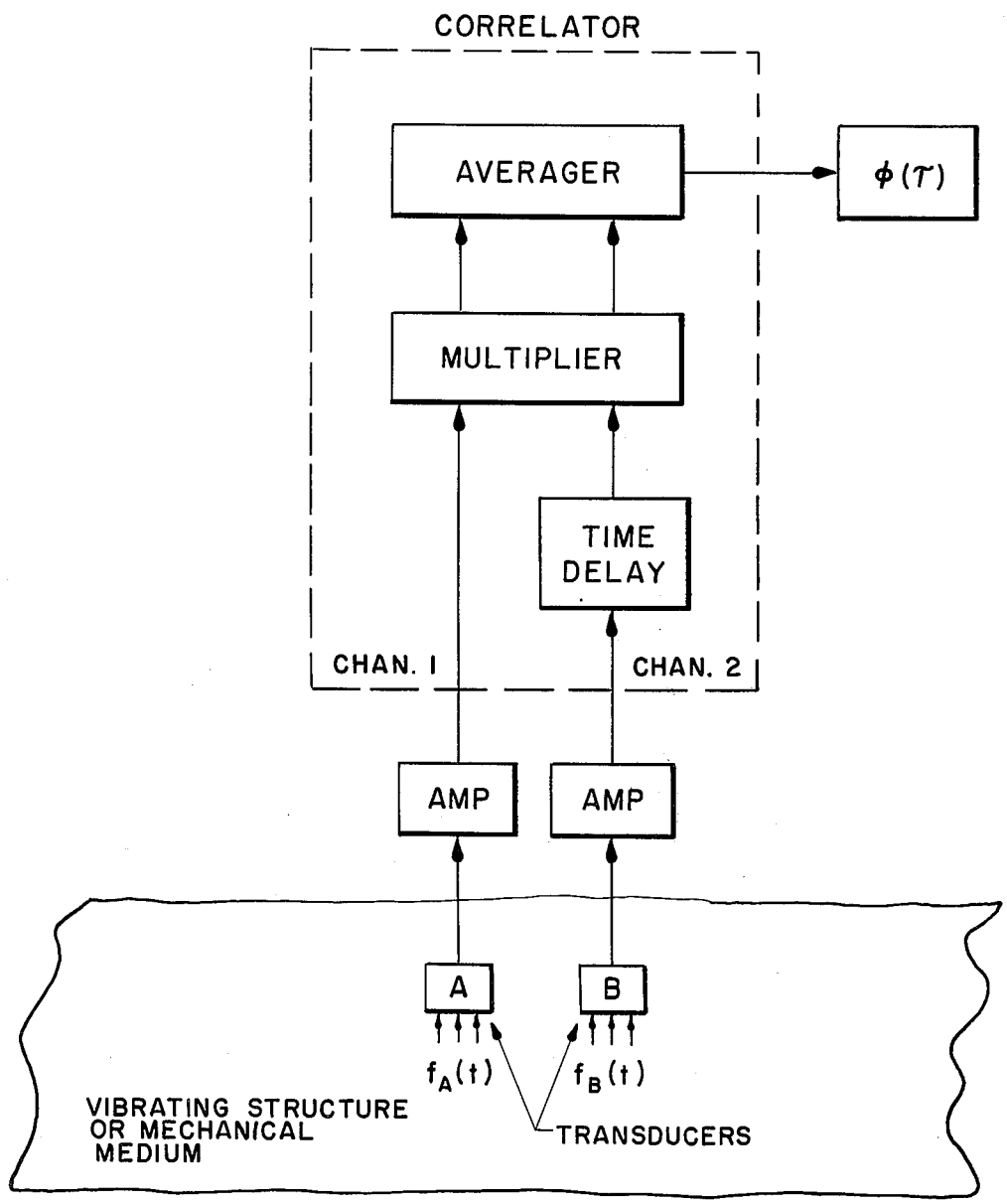
FIG. 1 is a prior art device and method for determining the cross-correlation function between two quantities.

FIG. 1 shows a prior art network for determining the cross-correlation function between two mechanical quantities sensed at two different locations. Transducer A senses a mechanical quantity at a first location and emits an electrical signal which is amplified and then supplied to a multiplier unit. Transducer B senses a mechanical quantity at a second location and supplies an electrical signal which is amplified and then delayed in a time delay unit. The output from the time delay unit is then fed to the multiplier unit. The multiplier then multiplies the signal from transducer A and the time delayed signal from the transducer B. An averager receives a signal from the output of the multiplier. The output of the averager is, then, representative of the cross-correlation function of the two mechanical quantities sensed by transducers A and B.

Figure 2:
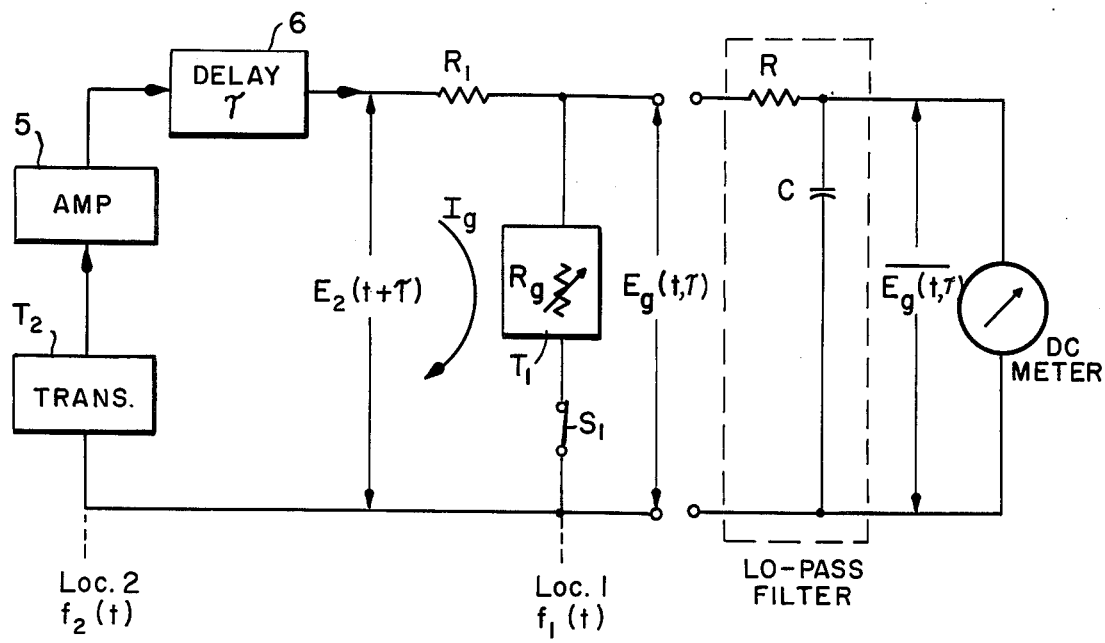
FIG. 2 is a network diagram of a first embodiment of the present invention.

Referring to FIG. 2, there is shown a transducer $T_2$ which senses the mechanical excitation at location 2. Transducer $T_2$ may be either of the active or passive type. The output from transducer $T_2$ is then amplified by amplifier 5. The amplified instantaneous voltage generated by the transducer $T_2$, $E_2(t)$ is directly proportional to the exciting mechanical motion $f_2(t)$ at location 2, i.e., $E_2(t) = Af_2(t)$, $A$ being the constant of proportionality. $E_2(t)$ is then delayed by the time $\tau$ and the resulting instantaneous voltage $E_2(t+\tau) = Af_2(t+\tau)$ is applied across the series combination of ballast resistor $R_1$ and instantaneous strain gauge resistance $R(t)$. It is a requirement of this invention that the transducer $T_1$ at location 1 be a passive electro mechanical transducer. $T_1$ is shown in this embodiment as a strain gauge transducer. However, any other suitable type of passive transducer could be used at location 1. The instantaneous current through the strain gauge may be expressed by $$(2) \quad I_g(t,\tau) = \frac{E_2(t+\tau)}{R_1 + R(t)}.$$

where the notation $I_g(t,\tau)$ has been used to explicitly display the dependence of the current through $T_1$ upon $\tau$. In equation (2), $R(t)$ represents the sum $$R(t) = R_g + \Delta R_o + \Delta R(t) \quad (3)$$

where $R_g$ equals the unstressed gauge resistance, $\Delta R_o$ equals the change in resistance of the gauge due to steady strains, $\epsilon_o$, $\Delta R(t)$ equals instantaneous resistance change due to instantaneous strain, $\epsilon(t)$. The resistance changes in a strain gauge produced when it is subjected to the strains $\epsilon(t)$ and $\epsilon_o$ are $$\Delta R(t) = GR_g \epsilon(t) \quad (4)$$

$$\Delta R_o = GR_g \epsilon_o$$

where $G$ is the gauge factor defined as the fractional change in the resistance per unit strain. In all practical applications, $G$ and the strains are of such magnitude that $R_1$ can easily be chosen such that $[R_1 + R_g]$ is much greater than $[\Delta R_o + \Delta R(t)]$.

Equation (2) then becomes $$(5) \quad I_g(t,\tau) = \frac{E_2(t+\tau)}{R_1 + R_g}$$

The instantaneous voltage across the strain gauge, $E_g(t)$, is given by Ohm's Law as $$E_g(t,\tau) = I_g(t) R(t) \quad (6)$$

which becomes, upon substituting from equations (5) (4) and (3)

$$(7) \quad E_g(t,\tau) = \frac{AGR_g}{R_1 + R_g} f_1(t) f_2(t+\tau) + \frac{AR_g(1 + G\epsilon_o)}{R_1 + R_g} f_2(t+\tau)$$

where we use the definition of $E_2(t+\tau)$, and defined $f_1(t) = \epsilon(t)$.

Now, passing the gauge output voltage through a low pass filter having a long time constant including resistance R and capacitance C, we obtain at the input to the DC voltage meter the voltage $$(8) \quad \overline{E_g(t,\tau)} = \frac{AGR_g}{R_1 + R_g} \overline{f_1(t) f_2(t+\tau)} + \frac{AR_g(1 + G\epsilon_o)}{R_1 + R_g} \overline{f_2(t+\tau)}.$$

If it is assumed that $f_2(t)$ is a stationary function, then $\overline{f_2(t+\tau)} = \overline{f_2(t)}$, i.e., does not depend upon the delay, $\tau$. Substituting from the equation (1), equation (8) yields for the cross-correlation function $$(9) \quad \phi(\tau) = \frac{R_1 + R_g}{AGR_g} \overline{E_g(t,\tau)} - V_o.$$

The cross-correlation function is seen to be directly proportional to the voltage output of the low pass filter with $V_o$ defined as the constant $$V_o = \left[\frac{1 + G\epsilon_o}{G}\right]\left[\overline{f_2(t)}\right].$$

Note that the average $\overline{f_2(t)}$ or the value of $V_o$ may easily be determined by opening the switch $S_1$, thereby removing the strain gauge from the circuit. The voltage measured by the meter is then simply $E_2(t) = A\overline{f_2(t)}$. Substituting this value into equation (9), we thus have obtained a measure of the cross-correlation function $\phi(\tau)$ for the delay $(\tau)$. By varying the delay imposed upon the signal $E_2(t)$, the method and apparatus herein disclosed enables the cross-correlation of two dynamic mechanical quantities to be obtained as a function of the time delay, $\tau$.

The assumption that $f_2(t)$ is a stationary function eliminates the necessity of determining the average $\overline{f_2(t+\tau)}$ for each value of delay $\tau$. However, the realization of this assumption is only a convenience and is not a necessity of the invention. The invention is applicable for both stationary and non-stationary functions.

Figure 3:
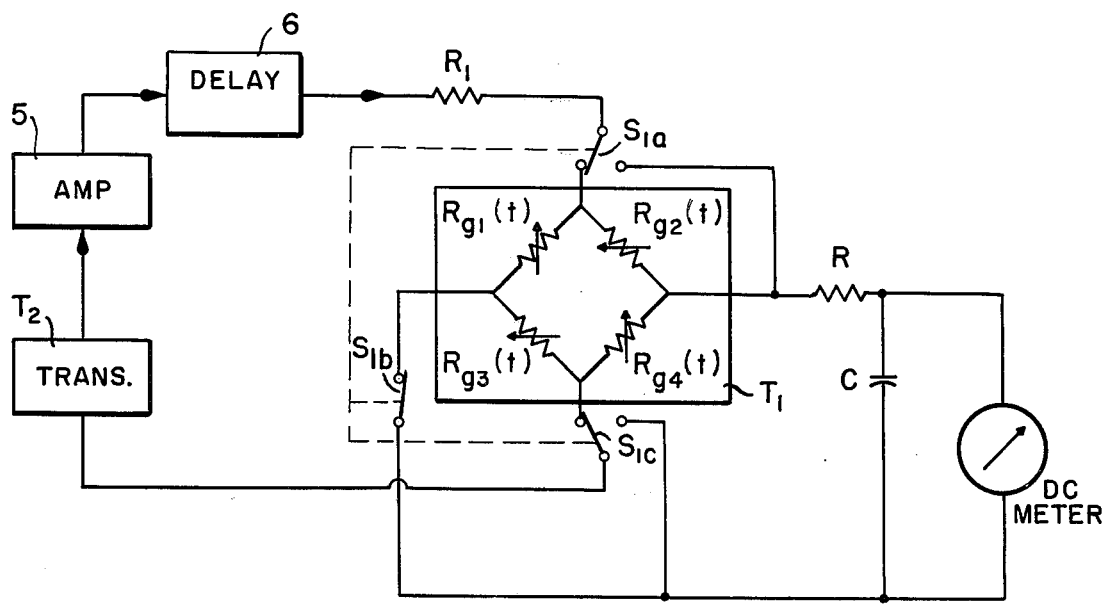
FIG. 3 is a network diagram of a second embodiment of the present invention.

FIG. 3 is essentially the same as FIG. 2 except that the single strain gauge at location 1 has been replaced by a four arm strain gauge bridge circuit to increase the sensitivity to the motion at location 1 and, hence, increase the voltage seen at the DC volt meter. In this embodiment, three ganged switches $S_1a$, $S_1b$, and $S_1c$ have been used to perform the function of switch $S_1$ in the embodiment shown in FIG. 2.

Various alternatives to the invention as herein described may be used in this invention. The active electromechanical transducer at location 2 may consist of any type available to measure the dynamic mechanical quantity of interest. For example, if the acceleration at location 2 is of interest, a piezoelectric accelerometer is used; if location 2 lies within a fluid then a piezoelectric hydrophone would be used, etc. The active transducer at location 2 may be replaced by a passive electro mechanical transducer such as a strain gauge; a capacitance gauge; any of the inductive transducers such as a differential transformer type, a variable reluctance gauge, or a mutual inductance transducer; a resistance potentiometer transducer etc. Each passive type would be accompanied by the electrical circuitry required in its usual operation. The specific type of transducer will depend upon the dynamic quantity under consideration. The single strain gauge or strain gauge bridge circuit at location 1 may be replaced by any other type of passive electro mechanical transducer or bridge circuit appropriate for the type of dynamic quantity under consideration. The transducer at location 1, as pointed out above, must be a passive electro mechanical transducer for the method to function. Among the various types of transducers which could be used at location 1 are those which were previously mentioned as substitutes for the transducer at location 2. The low pass RC filter may be replaced by any other type of averaging circuit, for example, an electronic intergrating circuit.

Thus, a novel invention has been disclosed which requires only simple apparatus to obtain accurate measurements of the cross-correlation of mechanical vibratory motions. The apparatus used is much less expensive than that required in prior art methods. Because of the unsophisticated apparatus used in this invention, the device of this invention is less prone to errors. The use of the passive electro mechanical transducer at location 1, such as a strain gauge, instead of an active transducer such as used in the prior art devices causes less mass loading of the vibrating structure. For light vibrating structures, this undesirable mass loading can drastically influence the motion. Moreover, use of a passive electro mechanical transducer such as a strain gauge at location 1 requires significantly less space than the transducer used in conventional methods.

Obviously, many modifications and variations of the present invention are possible in the light of the above teachings. It is, therefore, to be understood that within the scope of the appended claims the invention may be practiced otherwise than as specifically described.

What is claimed is:

1. A method of measuring the cross-correlation function of two dyamic mechanical quantities comprising in the steps of:
   sensing a first mechanical quantity at a first location with a first transducer to obtain a first electrical quantity;
   sensing a second mechanical quantity at a second location with a second transducer and energizing said second transducer with said first electrical quantity to obtain a second electrical quantity at the output of said second transducer, which is a signal proportional to the product of the two mechanical quantities
   averaging said second electrical quantity to produce an electrical signal proportional to the cross-correlation function of the two dynamic mechanical quantities.

2. The method of claim 1 wherein the step of obtaining a first electrical quantity includes the step of obtaining an initial electrical quantity from said first transducer and delaying said initial electrical quantity to produce said first electrical quantity.

3. An apparatus for measuring the cross-correlation function of two quantities comprising:
   first means for sensing a first mechanical quantity and for generating a first electrical signal related to a first mechanical quantity;
   second means including a sensing means energized by said first electrical signal for generating a second electrical signal related to the product of the first and the second mechanical quantity;
   third means connected to the output of said second means to average the output of said second means to produce a signal proportional to the cross-correlation of the two quantities;
   a fourth means connected to the output of the averaging means to indicate the output.

4. The apparatus of claim 3 wherein said first means includes a delay device.

5. The apparatus of claim 3 wherein said first means includes a passive transducer.

6. The apparatus of claim 3 wherein said first means includes an active transducer.

7. The apparatus of claim 3 wherein said second means includes a passive transducer.

8. The apparatus of claim 7 wherein said passive transducer is a strain gauge.

9. The apparatus of claim 8 wherein said strain gauge transducer comprises a strain gauge bridge circuit.

10. The apparatus of claim 3 of wherein a switch is connected to said second means and to the circuit of from said first means for operating between open and closed positions whereby when said switch is opened said averaging circuit averages said first electrical signal and when said switch is closed said averaging circuit averages said second electrical signal.

* * * * *